(12) United States Patent
Dunstan

(10) Patent No.: US 7,533,191 B2
(45) Date of Patent: May 12, 2009

(54) METHODS AND ARRANGEMENTS FOR DEVICES TO SHARE A COMMON ADDRESS ON A BUS

(75) Inventor: Robert A. Dunstan, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 138 days.

(21) Appl. No.: 11/479,787

(22) Filed: Jun. 30, 2006

(65) Prior Publication Data

US 2008/0126633 A1 May 29, 2008

(51) Int. Cl.
*G06F 3/00* (2006.01)
*G06F 13/14* (2006.01)

(52) U.S. Cl. .................... 710/3; 710/5; 710/305

(58) Field of Classification Search ............... 710/3–7, 710/100, 105–106, 305–313
See application file for complete search history.

(56) References Cited

U.S. PATENT DOCUMENTS

| | | | | |
|---|---|---|---|---|
| 4,912,627 A * | 3/1990 | Ashkin et al. ................. 710/9 |
| 5,317,693 A * | 5/1994 | Cuenod et al. ................ 710/9 |
| 5,596,727 A * | 1/1997 | Literati et al. ............... 710/300 |
| 6,173,349 B1 * | 1/2001 | Qureshi et al. .............. 710/110 |
| 6,178,517 B1 * | 1/2001 | Bertin et al. ................ 713/324 |
| 6,848,032 B2 * | 1/2005 | Benkual et al. ............. 711/146 |
| 6,981,087 B1 * | 12/2005 | Heitkamp et al. ........... 710/301 |
| 2003/0149824 A1 * | 8/2003 | Smith et al. ................. 710/305 |
| 2005/0223090 A1 * | 10/2005 | Ewing et al. ................ 709/223 |
| 2006/0123320 A1 * | 6/2006 | Vogt ........................... 714/762 |
| 2007/0156935 A1 * | 7/2007 | Ellison ....................... 710/106 |
| 2007/0234136 A1 * | 10/2007 | Leef et al. ................... 714/704 |
| 2008/0126633 A1 * | 5/2008 | Dunstan ..................... 710/100 |

* cited by examiner

*Primary Examiner*—Christopher B Shin
(74) *Attorney, Agent, or Firm*—Schubert Osterrieder & Nickelson PLLC

(57) ABSTRACT

Methods and arrangements for devices to share a common address on a bus are disclosed. Embodiments may comprise a host for medium management and one or more client devices coupled with a communication medium. The host and/or one or more of the client devices may comprise devices capable of originating communications across the communication medium, also referred to as originating devices. Furthermore, the host and/or one or more of the clients may comprise devices capable of receiving communications via the communication medium, also referred to as receiving devices. An application may be capable of transmitting a command to request a response by one of two or more devices that share a common address. In particular, a driver for an originating device may receive an instruction from the application to send a command to the device and the device may recognize the command based upon a value associated with the command.

25 Claims, 4 Drawing Sheets

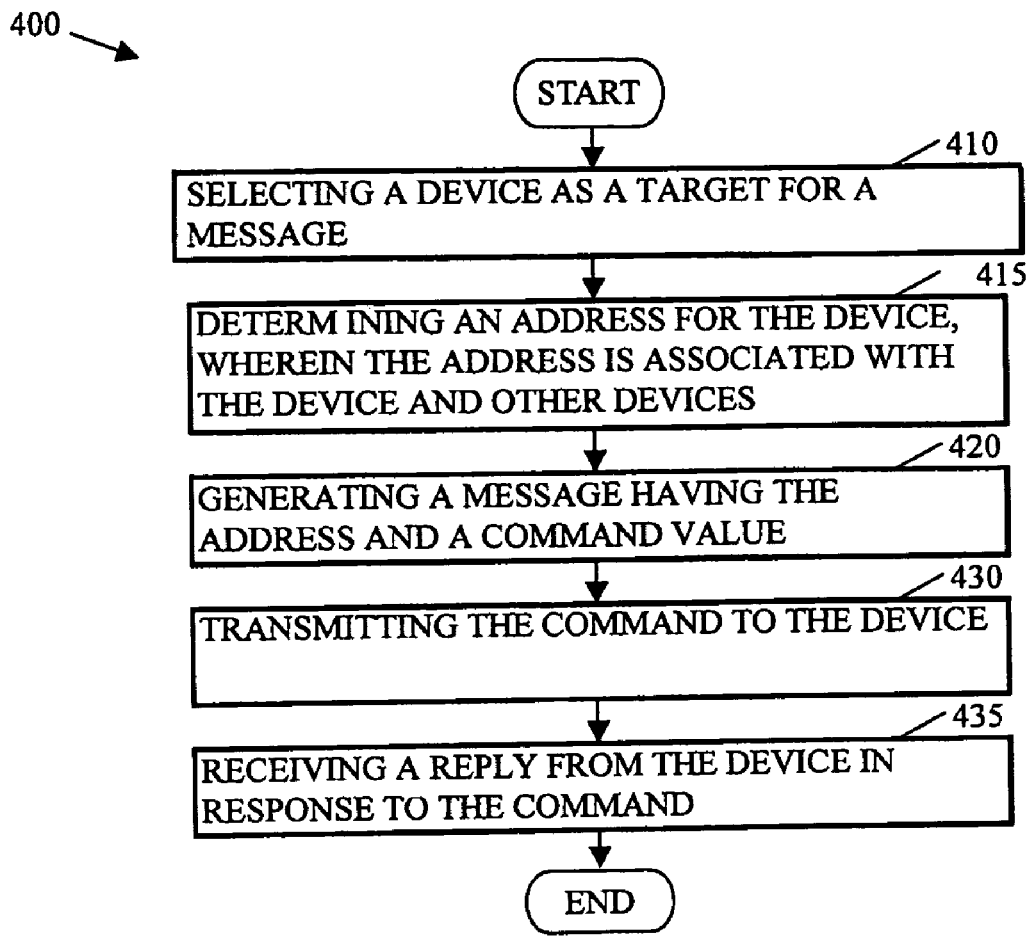

METHODS AND ARRANGEMENTS FOR DEVICES TO SHARE A COMMON ADDRESS ON A BUS

FIELD

The present invention is in the field of communications between devices. More particularly, the present invention relates to methods and arrangements for devices to share a common address on a bus.

BACKGROUND

Data buses are found in virtually all computers and processor-based devices to facilitate communication between various components. For instance, data buses may facilitate communications between a processor and random access memory, other application-specific integrated circuits (ASICs), and peripheral devices. While some buses require complex logic for coordination, high speeds and multiple wires for mass data transfers, other data buses are single wire, low-speed buses with relatively simple logic. Single-wire and two-wire data buses avoid many issues faced by more complex buses such as multiple traces, multiple pins and a high gate count, making such buses significantly less costly in terms hardware and space requirements.

Current two-wire buses, such as the I2C bus developed by Philips Electronics N.V., which support communication between multiple devices, address each client device separately. Addressing each device separately is problematic due to a trend to include multiple devices in a single package. In particular, many chip packages include multiple dies in the package and each die may include a separately addressable device, significantly increasing the number of addresses necessary to implement the data buses.

The larger number of addresses, increases the complexity of addressing logic necessary to implement such buses. Furthermore, this increased complexity increases the complexity of and, thus, overhead associated with the single-wire and two-wire data buses such as the silicon area occupied by bus interfaces for the bus.

BRIEF DESCRIPTION OF THE DRAWINGS

Aspects of the invention will become apparent upon reading the following detailed description and upon reference to the accompanying drawings in which like references may indicate similar elements:

FIG. 4 depicts a flowchart of an embodiment for an application to retrieve data from devices that share a common address.

DETAILED DESCRIPTION OF EMBODIMENTS

Figure 1:
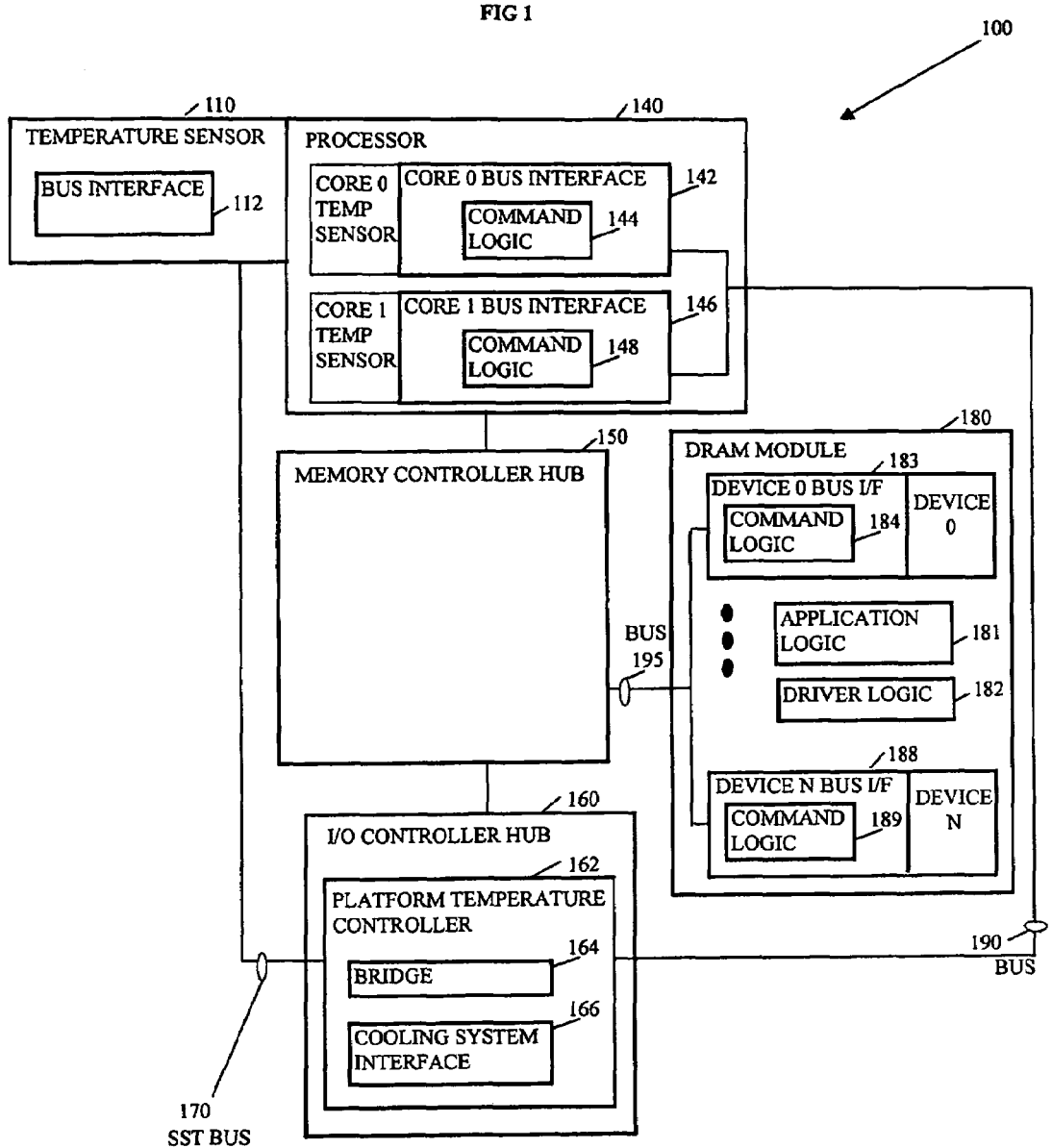
FIG. 1 depicts an embodiment of a system including a processor, temperature sensor, memory controller hub, memory, and an input-output (I/O) controller hub with a platform temperature controller.

The following is a detailed description of embodiments of the invention depicted in the accompanying drawings. The embodiments are in such detail as to clearly communicate the invention. However, the amount of detail offered is not intended to limit the anticipated variations of embodiments, but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods and arrangements methods and arrangements for devices to share a common address on a bus are contemplated. Embodiments may comprise a host device for medium management and one or more client devices coupled with a communication medium. The host device and/or one or more of the client devices may comprise devices capable of originating communications, or messages, across the communication medium and/or capable of receiving communications via the communication medium. In illustrations that follow, to distinguish the device that originated the communication from the device(s) that receive the communications, the device that originates a communication is often referred to as the originating device and devices that receive of the communications are often referred to as receiving devices. In many embodiments, the communication medium may be a single-wire bus such as a simple serial transport (SST) bus or the like.

In one embodiment, the originating device is capable of transmitting a command to request a response by one of two or more devices sharing a common address. In particular, a driver for the originating device may receive an instruction from, e.g., a software application or other code to gather temperature data from each of the devices. The software application may instruct the driver to transmit a command having a value associated with a first device of the more than one devices. The driver may drive the originating device to transmit the command in a communication, or message, with an address associated with the first device and other devices. The first device may respond with temperature data while the other devices no longer participate for the duration of the message.

In some embodiments, the value is a command value and the devices that share the common address ignore communications having command values associated with another device that shares the common address. In many of these embodiments, more than one of the commands available to the originating device may provoke the same response from devices that share a common address. In such embodiments, the devices may all respond to the those commands in substantially the same manner with substantially the same timing such that the devices may not be aware that other devices that share the same address respond to the commands substantially simultaneously.

As a further illustration, more than one device may reside on the same module and the module may be assigned a single address. In at least one embodiment, usage of the bus between devices may be arbitrated via bit contention. In some of these embodiments, a device may recognize bit contention when the device reads a different bit off the bus than the device attempted to write to the bus. For instance, each device connected to the bus may be designed to terminate participation in a message upon reading a logical 1 after writing a logical 0, or vice versa. In such embodiments, the originating device may transmit a command with a value that invokes essentially the same response from all the devices and bit contention may determine whether only one or more of the devices actually responds to the command.

While portions of the following detailed discussion describes embodiments with reference to specific configurations and protocols for buses, hardware, software, and other logic, persons of ordinary skill in the art will recognize that embodiments may be implemented with other configurations and other protocols to accomplish substantially the same functionality.

Turning now to the drawings, FIG. 1 illustrates an embodiment of a system 100. System 100 is a computer system such as a personal computer, a laptop, a workstation, and a server. Similar embodiments are implemented as, e.g., a portable music player, a portable video player, a smartphone or other cellular phone, a digital video camera, a digital still camera, a personal digital assistant (PDA), an external storage device, or the like. Further embodiments implement larger scale server configurations such as server systems that implement a system management bus (SMBus). In such embodiments, a microcontroller may serve as a simple serial transport (SST) host and SMBus-to-SST interface.

System 100 comprises a processor 140, a memory controller hub 150 coupled with dynamic random access memory (DRAM) module 180, and an input-output (I/O) controller hub 160. Processor 140 represents one or more processors for a system such as Intel®'s Pentium® processors, Xeon® processors, Itanium® processors, Celeron® processors, or the like. Memory controller hub 150 and I/O controller hub 160 represent a chipset such as Intel®'s 975X Express Chipset, 865P Chipset, 845G Chipset, 855GM Chipset, E7525 Chipset, E8870 Chipset, 852GME Chipset, 537EP Chipset, 854 Chipset, or the like. DRAM module 180 may be system memory supporting execution of instructions by processor 140 by storing data and instructions related to applications such as application logic 181, drivers such as driver logic 182, and other code.

The present embodiment may implement three separate buses: SST bus 170 and bus 190 hosted by I/O controller hub 160 and bus 195 hosted by memory controller hub 150. More specifically, I/O controller hub 160 comprises a host, platform temperature controller 162, that manages and bridges communications between SST bus 170 and bus 190. In some embodiments, I/O controller hub 160 may comprise separate hosts for SST bus 170 and bus 190 with or without a bridge 166, and, in other embodiments, I/O controller hub 160 may comprise only a host for SST bus 170 or bus 190. In further embodiments, one or both of the bus hosts and/or bridge 166 may be embodied in separate integrated chip package(s).

Platform temperature controller 162 may control temperature and air flow within system 100. For example, platform temperature controller 160 may read temperature data from devices about system 100 and adjust workload, forced air drivers, air outlet dampers, or the like to maintain designated operating conditions within system 100. In other embodiments, platform temperature controller 160 may control additional and/or other functions such as just workload or thermal shutdown of devices.

Platform temperature controller 162 comprises a bridge 164 and a cooling system interface 166. Bridge 164 may facilitate transmission of commands and gathering temperature data across more than one buses such as SST bus 170 and bus 190. In further embodiments, platform temperature controller 162 may access temperature data from DRAM module 180 via memory controller hub 150 or via a direct connection with DRAM module 180.

Cooling system interface 166 may comprise one or more control interfaces to control heat dissipation in various areas of system 100. For example, an operating system represented by instructions and/or data in application logic 181 executing on system 100 may interface with platform temperature controller 162 via driver 182 and cooling system interface 166 to retrieve current temperature data from core 0 bus interface 142 and core 1 bus interface 146 of processor 140. Based upon the temperature readings from the cores, the operating system may shift the processing workload between cores 0 and 1 or cooling interface 166 adjust the air flow, e.g., by adjusting fan speed, based upon the higher of the two core temperatures. For instance, if the current workload distribution between cores 0 and 1 is at 50 percent, the operating system may change the workload distribution to 70 percent for core 0 and 30 percent for core 1 if the temperature data for core 1 indicates that core 1 is running hotter than core 0. In further embodiments, cooling system interface 166 may increase fan speed for a fan that forces air flow around core 1 to increase heat dissipation from core 1.

FIG. 1 illustrates three temperature sensors coupled with platform temperature controller 162 via SST bus 170 and bus 190. DRAM module 180 may also include temperature sensors represented by one or more of devices 0 through N. Many embodiments may include more or less than three temperature sensors coupled with platform temperature controller 162.

Platform temperature controller 162 may transmit a command to temperature sensor 110 requesting temperature data. In several embodiments, because temperature sensor 110 has a single device associated with the address assigned to temperature sensor 110, bus interface 110 of temperature sensor 110 may recognize a temperature read request from platform temperature controller 162 regardless of the command value associated with the temperature read request. In other embodiments, bus interface 112 may respond only to a command with a command value associated with temperature sensor 110.

Processor 140, on the other hand, comprises two client devices, each comprising a temperature sensor and a bus interface: core 0 temperature sensor with core 0 bus interface 142 and core 1 temperature sensor with core 1 bus interface 146. Processor 140 may be assigned a single address to reduce the overall number of addresses handled by platform temperature controller 162. When the operating system requests retrieval of temperature data from the cores of processor 140, instructions of the driver logic 182 may instruct platform temperature controller 162 to transmit two commands to the address assigned to processor 140 via bus 190: a temperature read request with a command value of 0 and a temperature read request with a command value of 1. For instance, platform temperature controller 162 may first transmit the temperature request with a command value of 0. Core 0 bus interface 144 identifies the address as the address assigned to processor 140 and comprises command logic 144 to identify the command with a command value of 0. Thus, core 0 bus interface 142 reads the temperature data associated with core 0 in response to the temperature read request with a command value of 0 and returns the temperature data.

Command logic 148 of core 1 bus interface 146 also identifies the address as the address assigned to processor 140 but does not respond to the command because the command has a command value that is not 1 or other value to which command logic 148 is designed to respond. In several embodiments, command logic 148 may respond with a frame check sequence (FCS) checksum in response to header information (which is substantially identical to the FCS from core 0 bus interface), or at least a portion of the FCS, e.g., the first three bits, before terminating participation in the communication. In some embodiments, core 1 bus interface 146 may ignore the command upon determining that the command has a command value of 0. In further embodiments, core 1 bus interface 146 may not recognize the command because the command value is 0 and, as a result, may ignore the command.

Once the temperature data for core 0 is returned to platform temperature controller 162, platform temperature controller 162 may transmit the second temperature read request with the command value of 1. In a similar manner, core 0 bus interface 142 may recognize the address of the command as the address for processor 140 and may not respond or may respond with a FCS checksum in response to header information (which is substantially identical to the FCS from core 1 bus interface), or at least a portion of the FCS. Then, core 0 bus interface 142 may terminate bus activity upon receipt of the command with a command value of 1. Substantially simultaneously, command logic 148 of core 1 bus interface 146 may recognize the temperature read request has a command value of 1, identify the command as a temperature read request, and respond to the temperature read request by transmitting the temperature data for core 1 to platform temperature controller 162 via bus 190.

Memory controller hub 150 may comprise a host for bus 195. While bus 195 may have the same or similar specifications as SST bus 170 or bus 190, bus 195 may be designed to read from and/or write to DRAM cells of DRAM module 180. In the present embodiment, DRAM module 180 may comprise one or dual-inline memory modules (DIMMs) with up to 32 client devices, or bus interfaces, per module, represented by device 0 bus interface 183 through device N bus interface 188.

A single address may be assigned to each module to reduce the number of addresses associated with bus 195 and each of the 32 devices on a DIMM may be associated with a value between 0 and 31. Furthermore, each bus interface on the DIMM may be designed to recognize a command associated with a different value between 0 and 31. Thus, memory controller hub 150 can read from device 0 of a first DIMM of DRAM module 180 by transmitting a read command addressed to the first DIMM with a command associated with a value of 0. Similarly, memory controller hub 150 may write to device 1 of the third DIMM of DRAM module 180 by addressing a write command associated with a value of 1 to the third DIMM.

In several embodiments, some commands may be recognized and responded to by all of the devices. For instance, each of command logic 184 through 189 may recognize a command with a hexadecimal command value of 0xFF. To illustrate, a write command may have a hexadecimal command value of 0xFF and memory controller hub 150 may be capable of zeroing out all memory cells on the first DIMM by addressing the write command of 0xFF to the first DIMM. Furthermore, a read command may comprise a hexadecimal command value of 0xFF. If the bus configuration comprises a strong pull up for a logical 1 and a weak pull down for a logical 0, memory controller hub 150 may request a read from a cell from each device on a DIMM via the read command in an effort to determine whether any of the cells read as a logical 1. If all the responses are a logical 0, memory controller hub 150 may receive a response of a logical 0 from all the devices. On the other hand, one or more of the devices may respond with a logical 1 and bit contention arbitration may terminate transmission of data from the devices that attempt to respond with a logical 0. Note, in the present embodiment, devices need only assert a strong pull up for the logical 1 and do nothing for a logical 0 as the message's originator will assert a weak pull down. In other embodiments, the strong pull up for the logical 1 must be sufficiently strong with respect to the weak pull down so that the strong pull up can overcome weak pull down of multiple devices and still maintain a valid logical 1 on the bus.

Figure 2:
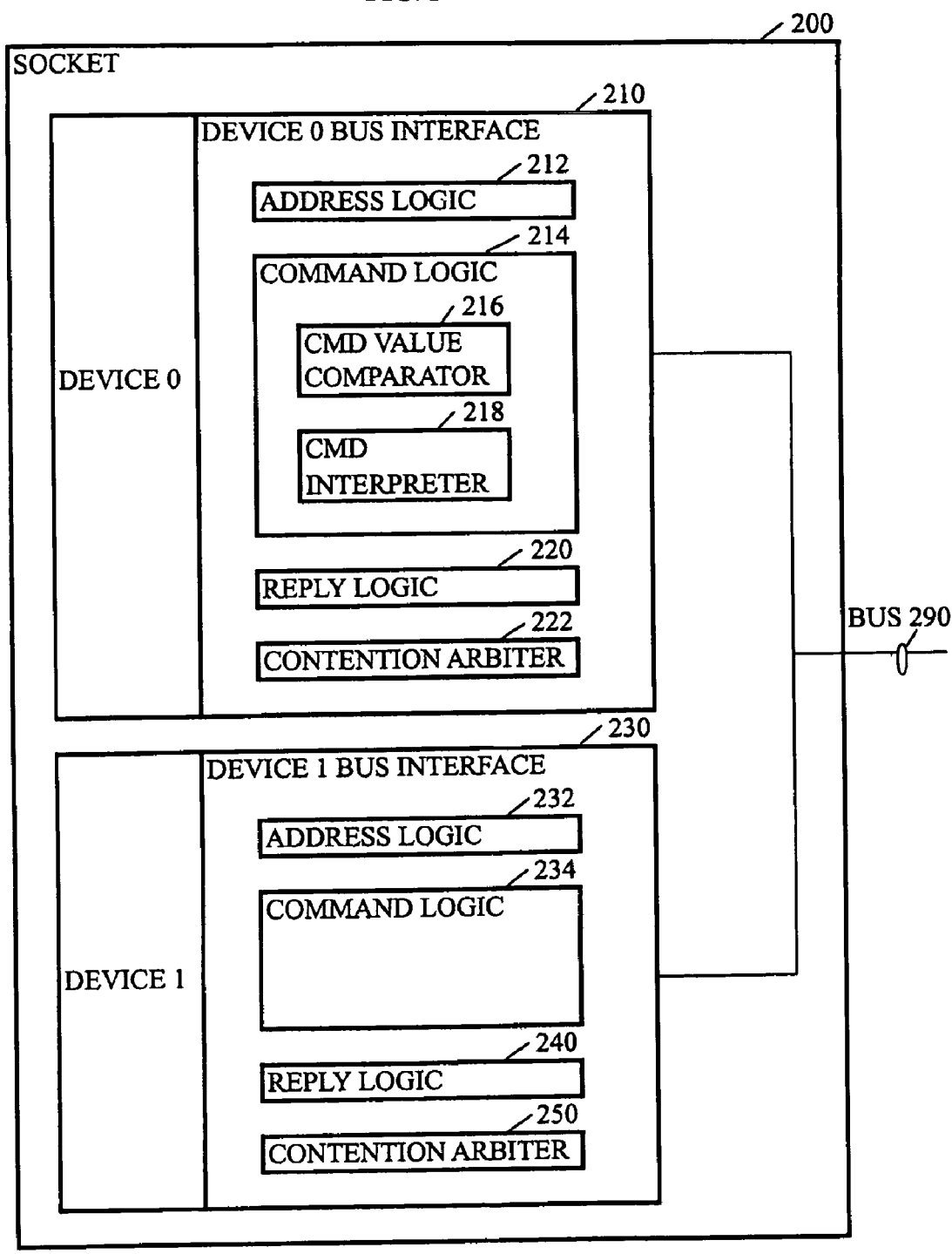
FIG. 2 depicts an embodiment of an addressable socket with two distinct devices.

FIG. 2 depicts an embodiment 200 of an addressable socket 200 with two distinct devices, device 0 coupled with device 0 bus interface 210 and device 1 coupled with device 1 bus interface 230. For instance, device 0 and device 1 may comprise devices that are included in a single chip package and inserted into socket 200.

Socket 200 may be a socket in a system such as system 100 of FIG. 1 and may couple with a bus 290 to couple device 0 and device 1 with other devices on bus 290. In the present embodiment, socket 200 is assigned a single address on bus 290. To facilitate transmission of unique responses from device 0 and device 1, device 0 bus interface 210 may only respond to commands with a first set of command values and device 1 bus interface 230 may only respond to commands with a second set command values. In some embodiments, the first set and second set may include some of the same command values, such as commands for which the responses from device 0 and device 1 should be substantially identical.

Device 0 bus interface 210 may comprise address logic 212, command logic 214, reply logic 220, and contention arbiter 222. Address logic 212 may determine whether a communication on bus 290 is directed toward an address assigned to socket 200. When address logic 212 determines that a communication is not addressed to socket 200, device 0 bus interface may not respond to the communication. On the other hand, when address logic 212 determines that a communication is addressed to socket 200, command logic 214 may evaluate the command received in the communication.

Command logic 214 may be logic to determine whether to respond to the command in the communication and how to respond. Command logic 214 comprises a command value comparator 216 and a command interpreter 218. Command value comparator 216 may compare a command value of the command receive in the communication against a values in the first set of command values associated with device 0. If the command value is included in the set, command interpreter 218 may identify the command. For instance, if the command is read temperature data, reply logic 220 may read data of temperature sensor and transmit the temperature data via bus 290. On the other hand, if command interpreter 218 determines that the command is a command to reset a temperature sensor device, reply logic 220 may reset the temperature device and may reply with a confirmation or not reply.

Contention arbiter 222 may be a bit arbiter to implement bus arbitration for bus 290 based upon bit contention. For instance, if reply logic 220 attempts to write a logical 0 to bus 290 in response to a command, but a logical 1 is read back from bus 290 during verification of the write, contention arbiter 222 may discontinue writes to bus 290 until a subsequent message is received.

Similar to device 0 bus interface 210, device 1 bus interface 230 comprises address logic 232, command logic 234, reply logic 240, and contention arbiter 250. Unlike device 0 bus interface 210, device 1 bus interface 230 responds to commands with command values in the second set of command values. For instance, while receiving a communication, address logic 232 may determine if the address of the communication is associated with socket 200, command logic 234 will determine whether the command value of the command in the communication is in the second set of command values, and, if the command value is, reply logic 240 may respond to the command by transmitting data and/or performing another action. Contention arbiter 250 monitors for bit contention and terminates a response to a communication from device 1 bus interface 230 upon detecting bit contention.

Figure 3:
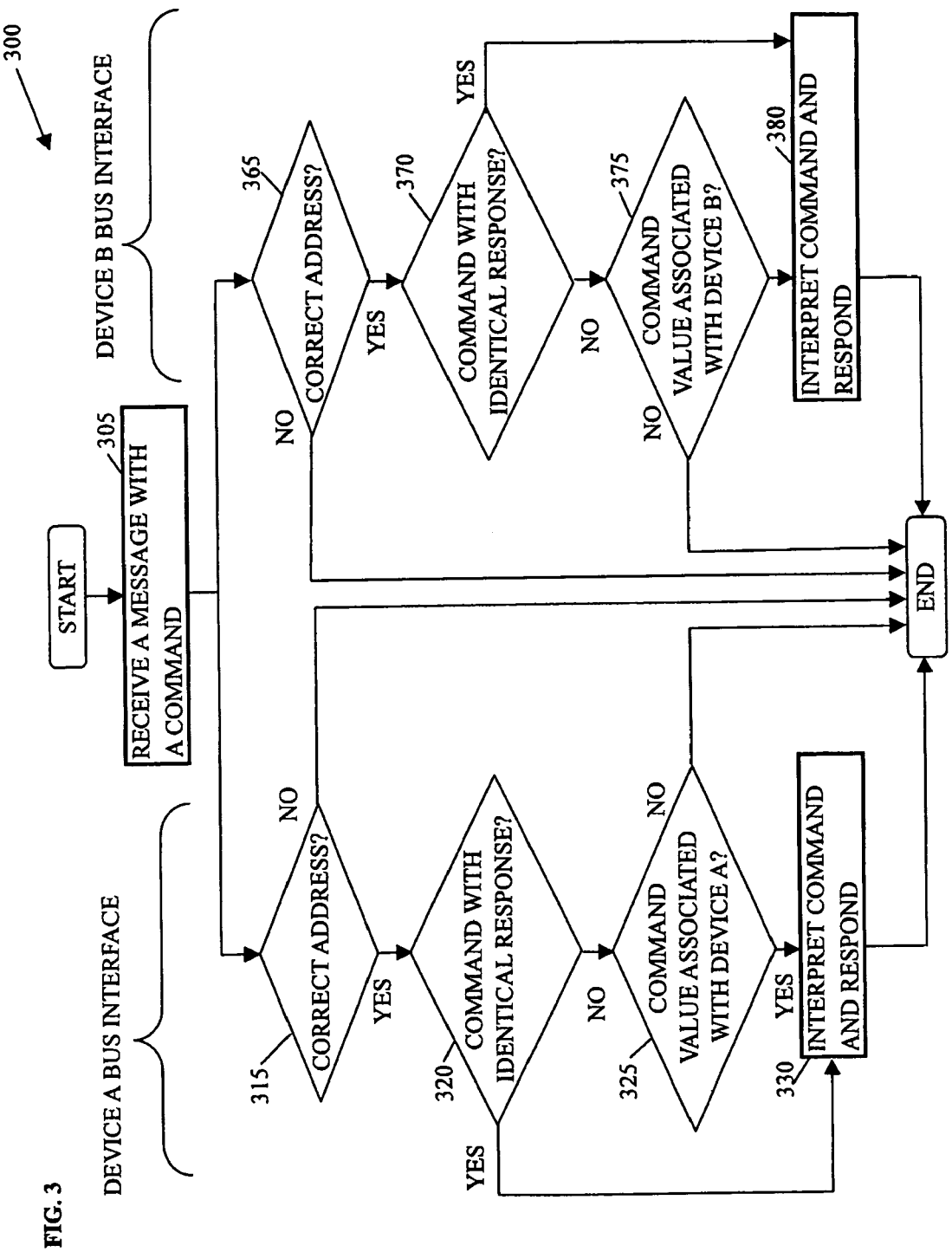
FIG. 3 depicts a flowchart of an embodiment for bus interfaces of devices that share a common address.

FIG. 3 depicts a flowchart 300 of an embodiment for bus interfaces of devices A and B, which share a common address.

More specifically, flowchart 300 shows a logical flow for a message through a device A bus interface and a device B bus interface. Note that the messages are evaluated in parallel through the bus interfaces.

Flowchart 300 begins with receiving a message with a command (element 305). For instance, the device A and device B may reside at the same addressable location or may reside in different addressable locations assigned to the same address for purposes of communication across a bus. Device A interface may determine whether the address associated with the message is the correct address for device A bus interface, or an address for which device A bus interface will respond (element 315). If the address is not an address for which device A interface is designed to respond, evaluation of the communication ends.

On the other hand, if the address of the message is one for which device A bus interface is designed to respond, device A bus interface may determine whether the command is a command for which the response by device A bus interface is identical to a corresponding response by device B bus interface (element 320). In many embodiments, element 320 is accomplished by a series of comparisons of the command value from the communication against values of commands to which device A bus interface is designed to respond. For example, device A bus interface may be adapted to respond to three commands with substantially identical response as device B bus interface. In such embodiments, element 320 may compare the command value associated with the communication against the values of the three commands in series. If the command value of the communication matches any of the three commands, device A bus interface will interpret and respond to the command from the communication (element 330).

Similarly, device A bus interface and device B interface may respond identically to an identifiably erroneous or unrecognizable command. If the command is identifiably erroneous or unrecognizable, device A bus interface may interpret and respond to the command from the communication (element 330) with a bad WriteFCS, which may comprise an FCS with one or more bits inverted. Device B bus interface may respond in a substantially identical way at element 380.

On the other hand, if the command value associated with the communication does not match a command value at element 320 and is not identifiably erroneous or unrecognizable, the command value associated with the communication may be compared with one or more command values associated with device A (element 325). These command values may be assigned to device A so device A can respond with a unique response to the command. For instance, if device A comprises a temperature sensor on a DRAM module, a command with a command value associated with device A may initiate a response including a temperature reading from that temperature sensor (element 330).

In other embodiments, more than two devices may share the same address. In such embodiments, command values may be associated with groups of two or more devices such that subsets of the devices respond to certain commands. For example, a first subset of devices may respond to a first reset command having a first command value and a second subset of devices may respond to a second reset command having a second command value.

The command evaluation path of device B bus interface may be similar to that of device A bus interface. In particular, at element 360, device B interface may determine whether the address associated with a communication is one to which device B interface is designed to respond. If device B interface is not designed to respond to the address then device B interface may terminate evaluation of the communication.

At element 370, device B interface may compare the command value associated with the communication against one or more command values that would provoke a substantially identical response from both device A interface and device B interface. If there is a match, device B interface interprets and responds to the command (element 380). If the command is identifiably erroneous or unrecognizable, device B interface may respond to the command (element 380) with a corresponding reply. Otherwise, device B interface compares the command value of the communication against one or more command values associated with device B. If there is no match, device B bus interface may do nothing. On the other hand, if there is a match, device B interface may interpret the command and respond accordingly (element 380).

FIG. 4 depicts a flowchart 400 of an embodiment for an application to retrieve data from devices that share a common address. In some embodiments, the application may interact with other code such as a driver to implement the following functions. For example, the application may be aware of devices from which data may be collected or written and the driver may associate device descriptions from the application into specific commands.

Flowchart 400 begins with selecting a device as a target for a message (element 410). For example, the application may select a processor as a target for a message to retrieve temperature data. In many embodiments, the application may be aware that the processor has two cores and one integrated temperature sensor in each core. Thus, the application may request the temperature data from each of the cores via the driver. The application may identify the first core with a first designation and the second core with a second designation. The driver may then determine the address assigned to the processor (element 415). The address assigned to the processor may be a fixed address or a dynamically assigned address, depending upon the configuration of the system. The driver may have access to the address in an address table and select the address based upon the designation of the processor by the application.

Upon determining the address for the processor, the driver may generate a message with a command associated with the first designation and a message with a command associated with the second designation. To generate the first message, the driver may select a command from a table of commands referenced by the first designation. The driver may then transmit the first message to a command queue for a host of an SST bus. Similarly, the driver may generate the second message and transmit the second message to the queue. The host may then serially transmit the messages to the processor (element 430).

After transmitting the first message, the application may receive a reply from the processor including the temperature reading for the first core (element 435). In a similar manner, the application may receive the temperature reading for the second core in response to the second message (element 435).

Another embodiment of the invention is implemented as a program product for use with a system to perform processes such as the processes described in conjunction with system 100 as illustrated in FIG. 1 or other embodiments described in FIGS. 2-4. The program(s) of the program product defines functions of the embodiments (including the methods described herein) and can be contained on a variety of media. Illustrative media include, but are not limited to: (i) information permanently stored on non-writable storage media (e.g., read-only memory devices within a computer such as CD-ROM disks readable by a CD-ROM drive); (ii) alterable information stored on writable storage media (e.g., a Universal Serial Bus (USB) flash drive or hard-disk drive); and (iii) information conveyed to a computer by a tangible, communications medium. Such media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by a computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates systems and arrangements for devices to share a common address. It is understood that the form of the invention shown and described in the detailed description and the drawings are to be taken merely as examples. It is intended that the following claims be interpreted broadly to embrace all the variations of the embodiments disclosed.

Although some embodiments of the present invention have been described in detail, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus comprising a device group with at least a first device and a second device to identify commands directed to the first device and commands directed to the second device, the apparatus comprising:
   the device group to be associated with a single address for receiving communications via the bus for at least the first device and the second device, and comprises address logic to determine if a message comprising a message address and a message command is addressed to the device group by determining if the message address is the single address, the message command being an instruction that can be executed by one or more devices of the device group, the device group comprising:
   the first device to couple with the bus, the first device comprising a first command logic to determine how the first device responds to the message command, the first command logic comprising:
      a first command comparator to compare a command value of the message command against a first set of one or more command values to associate the message command with the first device if the command value of the message command is within the first set of one or more command values; and
      a first command interpreter of the first device to receive the message command for execution if the first command comparator associates the command value with the first device; and
   the second device to couple with the bus, the second device comprising a second command logic to determine how the second device responds to the message command, the second command logic comprising:
      a second command comparator to compare the command value of the message command against a second set of one or more command values to associate the message command with the second device if the command value of the message command is within the second set of one or more command values; and
      a second command interpreter of the second device to receive the message command for execution if the second command comparator associates the command value with the second device.

2. The apparatus of claim 1, wherein the device group comprises an address comparator to determine the single address is associated with the first device and the second device.

3. The apparatus of claim 1, wherein the first device comprises reply logic to respond to the message command based upon interpretation by the first command interpreter.

4. The apparatus of claim 3, wherein the reply logic is to respond to the message command by transmission of data to an originating device via the bus, wherein the originating device transmitted the message.

5. The apparatus of claim 1, wherein the first device comprises a contention arbiter to terminate transmission of a reply to the message command in response to bit contention on the bus.

6. The apparatus of claim 1, wherein the first device comprises a serial bus interface to couple the message command comparator with the bus, wherein the bus is a serial bus.

7. The apparatus of claim 1, wherein the message command comparator comprises logic to ignore another command with a command value other than the message command value of the message command.

8. The apparatus of claim 1, wherein the first command comparator comprises logic to reject another command with a command value other than the message command value of the message command.

9. A method to identify a message command with one or more devices of more than one devices in a device group, wherein the device group is associated with a single address for receiving communications via a bus for the more than one devices and comprises at least a first device and a second device, the method comprising:
   receiving, by the device group, a message comprising the single address and the message command, wherein the message command is an instruction that can be executed by the one or more devices;
   determining, by address logic, that the message comprises the single address to determine if the message is addressed to the device group;

determining, by command logic of the first device, a command value of the message command to determine how the first device will respond to the message command;

comparing, by the command logic of the first device, the command value against a first set of one or more command values associated with the first device of the more than one devices to determine if the first device will respond;

responding, by the first device, to the command if the command value matches at least one command value in the first set of one or more command values associated with the first device;

determining, by command logic of the second device, the command value of the message command to determine how the second device will respond to the message command;

comparing, by the command logic of the second device, the command value against a second set of one or more command values associated with the second device of the more than one devices to determine if the second device will respond; and responding, by the second device, to the message command if the command value matches at least one command value in the second set of one or more command values associated with the second device.

10. The method of claim 9, further comprising transmitting by the first device and by the second device of the device group, a checksum in response to transmission of the message.

11. The method of claim 9, wherein comparing the command value comprises comparing the command value with a die number of the first device.

12. The method of claim 9, wherein responding to the message command comprises transmitting data in response to the message command.

13. The method of claim 9, wherein responding, by the first device, to the message command comprises terminating participation in the message if the command value does not match at least one command value in the first set of one or more command values.

14. A system to select from more than one interfaces via a message command, the system comprising:

a device group, wherein the device group to be associated with a single address for receiving communications via a bus for at least the first device and the second device and comprising address logic to determine if a message comprising a message address and the message command is addressed to the device group by determining if the message address is the single address, the message command being an instruction that can be executed by one or more devices of the device group, the device group comprising:

the first device to couple with the bus, the first device comprising a first command logic to determine how the first device responds to the message command, the first command logic comprising a first interface of the more than one interfaces to respond to a message in response to a determination that a command value of the message command matches a device value associated with the first device;

the second device to couple with the bus comprising a second command logic to determine how the second device responds to the message command, the second command logic comprising a second interface of the more than one interfaces to respond to the message in response to a determination that the command value of the message command matches a device value associated with the second device; and dynamic random access memory coupled with the device group.

15. The system of claim 14, wherein the second interface comprises a contention arbiter to arbitrate use of the bus based upon bit contention.

16. The system of claim 14, wherein the first interface comprises a command comparator to compare the command value of the message command against the device value of the first device.

17. The system of claim 16, further comprising a command interpreter, wherein the command interpreter comprises logic to determine a response to the message command.

18. The system of claim 17, further comprising reply logic to transmit data via the bus to respond to the message command.

19. The system of claim 14, wherein the first interface comprises a bus interface for a first of more than one dies of a processor.

20. The system of claim 14, wherein the first interface comprises a bus interface for a first of more than one memory chips of the device group, the device group being a memory module.

21. The system of claim 20, wherein the dynamic random access memory comprises a memory chip on the memory module.

22. The system of claim 14, wherein the dynamic random access memory is coupled with the device group via a memory controller hub.

23. A tangible, machine-accessible medium containing instructions, which when executed by a storage device, cause the storage device to perform operations, the operations comprising:

selecting a first device of a device group as a target of a message, the message comprising a message address and a message command, the message address to address the message to the device group and the message command being an instruction that can be executed by the first device, wherein selecting the first device as the target of the message comprises determining the message address for the device group, wherein the device group comprises the first device and one or more other devices, and selecting the message command from a group of message commands based upon a command value of the message command to distinguish the first device from the other devices of more than one devices of the device group associated with the message address;

generating the message comprising the message address of the device group to associate the message with the more than one devices and the message command to identify the first device of the more than one devices; and transmitting the message to the first device by transmitting the message on a bus coupled with the device group, the first device being coupled with the bus via the device group to receive the message.

24. The tangible, machine-accessible medium of claim 23, wherein generating the message comprises selecting the message command from more than one message commands, wherein the more than one message commands comprise message commands with command values associated with each of the more than one devices.

25. The tangible, machine-accessible medium of claim 23, wherein transmitting the message comprises transmitting the message via a driver.

* * * * *